US012128644B2

(12) United States Patent
Ronquist

(10) Patent No.: US 12,128,644 B2
(45) Date of Patent: Oct. 29, 2024

(54) ARRANGEMENT FOR CUTTING PAPER BOARD SHEETS, AND MACHINE COMPRISING SAID ARRANGEMENT

(71) Applicant: BERG INDUSTRIES AB, Stockholm (SE)

(72) Inventor: Olof Ronquist, Örebro (SE)

(73) Assignee: EMBA HOLDING AKTIEBOLAG, Stockholm (SE)

( * ) Notice: Subject to any disclaimer, the term of this patent is extended or adjusted under 35 U.S.C. 154(b) by 444 days.

(21) Appl. No.: 15/777,989

(22) PCT Filed: Nov. 25, 2016

(86) PCT No.: PCT/SE2016/051170
§ 371 (c)(1),
(2) Date: May 22, 2018

(87) PCT Pub. No.: WO2017/091139
PCT Pub. Date: Jun. 1, 2017

(65) Prior Publication Data

US 2018/0333932 A1 Nov. 22, 2018

(30) Foreign Application Priority Data

Nov. 25, 2015 (SE) .................................... 1551534-9

(51) Int. Cl.
*B31B 50/20* (2017.01)
*B26D 1/24* (2006.01)
(Continued)

(52) U.S. Cl.
CPC .............. *B31B 50/20* (2017.08); *B26D 1/245* (2013.01); *B26D 7/26* (2013.01); *B31B 50/146* (2017.08);
(Continued)

(58) Field of Classification Search
CPC ..... B31B 50/20; B31B 50/624; B31B 50/146; B31B 50/58; B31B 50/25; B31B 50/682;
(Continued)

(56) References Cited

U.S. PATENT DOCUMENTS 3,353,460 A 11/1967 Henc
3,499,370 A * 3/1970 Gugolz .................. B31B 50/00 493/342

(Continued)

FOREIGN PATENT DOCUMENTS

EP 0318174 A2 11/1988
JP 2000-79645 A 3/2000
JP 2013-169690 A 9/2013

OTHER PUBLICATIONS

International Search Report corresponding International application PCT/SE2016/051170, dated Feb. 28, 2017, 4 pages.

(Continued)

*Primary Examiner* — Sameh Tawfik
(74) *Attorney, Agent, or Firm* — Ronald M. Kachmarik; Cooper Legal Group LLC

(57) ABSTRACT

An arrangement for cutting paper board sheets. The arrangement includes a first wheel and a second wheel. The first wheel is arranged to rotate around a first axis. The first wheel includes a knife and an element formed as a circular arc with substantially the same radius as the peripheral surface of the first wheel and a corresponding recess formed in the first wheel peripheral surface. The element is pivotally arranged around an axis substantially parallel to the first axis in the recess and the knife is extending from the element such that the position of the knife in relation to the first wheel is adjusted by pivoting the peripheral element by adjustment structure arranged to secure the peripheral element in the desired position. Also, a machine can include the arrangement.

11 Claims, 5 Drawing Sheets

(51) Int. Cl.

| | |
|---|---|
| ***B26D 7/26*** | (2006.01) |
| ***B31B 50/14*** | (2017.01) |
| ***B31B 50/58*** | (2017.01) |
| ***B31B 50/62*** | (2017.01) |
| *B31B 50/00* | (2017.01) |
| *B31B 50/04* | (2017.01) |
| *B31B 50/25* | (2017.01) |
| *B31B 50/68* | (2017.01) |
| *B31B 50/88* | (2017.01) |
| *B31B 100/00* | (2017.01) |
| *B31B 110/35* | (2017.01) |
| *B31B 120/30* | (2017.01) |
| *B31B 120/70* | (2017.01) |

(52) U.S. Cl.
CPC ............ *B31B 50/58* (2017.08); *B31B 50/624* (2017.08); *B31B 50/006* (2017.08); *B31B 50/042* (2017.08); *B31B 50/25* (2017.08); *B31B 50/622* (2017.08); *B31B 50/682* (2017.08); *B31B 50/88* (2017.08); *B31B 2100/0022* (2017.08); *B31B 2110/35* (2017.08); *B31B 2120/302* (2017.08); *B31B 2120/70* (2017.08)

(58) Field of Classification Search
CPC .......... B31B 50/622; B31B 2100/0022; B31B 2120/302; B31B 2110/35; B31B 2120/70; B31B 50/066; B31B 50/042; B31B 50/88; B26D 1/245; B26D 7/26
USPC ............................................................ 493/64
See application file for complete search history.

(56) References Cited

U.S. PATENT DOCUMENTS 3,518,922 A * 7/1970 Kuehn ................ B26D 7/1818 493/365
3,575,091 A * 4/1971 LaBantschnig .......... B26D 3/14 493/365
3,772,953 A * 11/1973 Sullivan ............... B26D 7/2642 83/332
3,926,084 A 12/1975 Blazer
4,167,884 A * 9/1979 Santanna ............. B26D 1/0006 493/365
4,699,033 A 10/1987 Gherardi
4,725,261 A * 2/1988 Millard ................ B26D 1/0006 493/342
4,805,502 A * 2/1989 Ishigure ................... B26D 3/14 493/368
4,860,623 A * 8/1989 Pawelko ................ A24C 5/473 83/346
4,932,298 A * 6/1990 Capdebosco ........ B26D 7/2642 83/332
5,144,874 A * 9/1992 Garrett ................. B26D 1/0006 83/332
5,367,928 A * 11/1994 Geiser ....................... B23C 3/00 83/13
5,386,753 A * 2/1995 Baron ...................... B26D 3/12 493/64
5,720,210 A * 2/1998 Okahashi ............... B26D 1/405 83/342
5,904,086 A * 5/1999 Figge ..................... B23D 25/02 83/674
6,026,727 A * 2/2000 Meeks .................. B26D 1/626 83/285
6,478,725 B1 11/2002 Bengt et al.
6,729,217 B2 * 5/2004 Loewensberg ........... B26D 5/34 493/473
7,044,040 B1 * 5/2006 Smith .................. B26D 7/1818 493/342
7,181,993 B2 * 2/2007 Williams ................. B26D 1/29 425/113
8,579,777 B2 * 11/2013 Hatano ................... B31B 50/00 493/179

OTHER PUBLICATIONS

Corresponding Japanese Application No. 2018-547252, Japanese Office action dated Aug. 25, 2020.

* cited by examiner

ARRANGEMENT FOR CUTTING PAPER BOARD SHEETS, AND MACHINE COMPRISING SAID ARRANGEMENT

TECHNICAL FIELD

The present invention relates to an arrangement for cutting paper board sheets fed through the arrangement along a direction L, and a machine comprising said arrangement.

TECHNICAL BACKGROUND

Packages of different types and sizes made of corrugated cardboard, or corrugated paperboard, are used within many different areas to pack and protect different kinds of products.

The manufacturing of these packages is generally performed in different steps starting from a rectangular sheet of raw corrugated paperboard. In the first step the raw sheets of paper board are cut, or trimmed, such that substantially flat rectangular paper boards with a predetermined shape is formed. The prepared sheet of paper board is often referred to as a box blank. The shape of the box blank is adapted to generate a package with the desired size and shape in the end of manufacturing process The prepared box blank is folded to form the desired box-shaped package.

In order to facilitate and improve the quality of the folds, folding lines, also called creasing lines, are formed in the box blanks before the folding begins.

During the different manufacturing steps the box blanks are fed at substantially constant speed though the manufacturing device such that different actions could be performed on the paper board/box blank in a predetermined order.

Each box blank is designed to form a rectangular box and consequently comprises four side sections, bottom sections and top sections separated by creasing lines. The box blank furthermore comprises an tongue, frequently referred to as a glue flap, which after the folding of the box blank has been completed will bear against the inner or outer side of the neighboring side section such that these may be joined together by an adhesive joint, an adhesive tape or staples.

The cutting of for example the box blank glue flap is done by cutting devices comprising a first wheel provided with knives arranged on one side of the box blank and a second wheel arranged on the opposite side such that the box blank is held in the correct position during the cutting. Both wheels rotate at constant speed corresponding to the feeding speed of the box blanks around axes extending transverse to the feeding direction of box blanks. The distance between the wheels is adjusted to ensure that the knives cut through the box blank but preferably is not in contact with the second wheel. Unfortunately it is very difficult to achieve the desired correctness in the distance between the first and second wheel. If the distance is to big the knives will not cut through the box blank, and if the distance is too small the edge of the knives is damaged.

One solution that has been tested to reduce the problem described above is to make the second wheel of a less hard material, for example plastic or rubber. However, it has turned out that the surface of the second wheel is damaged rapidly by the knives when the wheels rotate at high speed and there is consequently a need for an improved arrangement that reduces the problems described above.

SUMMARY OF THE INVENTION

The present invention, as defined by within the present disclosure, relates to an arrangement for cutting paper board sheets, and a machine comprising said arrangement, that to at least some extent reduce the problems defined above.

The arrangement for cutting paper board sheets fed through the arrangement along a direction L according to the invention comprises:

a first wheel arranged to rotate around a first axis extending substantially transverse to the direction L, said first wheel comprises at least one knife extending from a peripheral surface of the wheel;

a second wheel arranged to rotate around a second axis extending substantially transverse to the direction L parallel to the first axis, said second wheel is arranged in the same plane as the first wheel and comprising a peripheral surface arranged adjacent the knife such that the paper board sheets are cut between the first and the second wheel;

wherein the first wheel comprises an element for each knife, said element is formed as a circular arc with substantially the same radius as the peripheral surface of the first wheel and a corresponding recess formed in the first wheel peripheral surface, said element is pivotally arranged around an axis A substantially parallel to the first axis in said recess and said knife is extending from the element such that the position of the knife in relation to the first wheel is adjusted by pivoting the peripheral element by adjustment means arranged to secure the peripheral element in the desired position.

The arrangement for cutting paper board sheets fulfills the objectives defined above since the element, due to its design, provides an elastic support for the knife. This is very advantageous since the knife is able to move slightly towards the centre of the first wheel instead of being damaged by to rough contact with the surface of the second wheel. The fact that the knife is able to flex reduces the risk that the knife is damaged considerably and increases the length between required replacements of the knife. The arrangement furthermore makes it easy to adjust the radial position of the knife since the angular position of the element could be easily adjusted by the adjustment means.

In one embodiment of the arrangement, the knife is removably arranged in one end of the element to facilitate replacement of the knife without replacing the element at the same time to reduce the amount of waste material and costs. The arrangement furthermore makes it easier to replace the knife compared to already existing arrangements.

In one embodiment of the arrangement, the knife extends in substantially radial direction from the centre of the first wheel from the element. This embodiment is favorable since the force exerted from the sheet of paper board and the second wheel on the knife is directed in substantially radial direction towards the centre of the first wheel, i.e. corresponding to the orientation of the knife such that the knife will move radially inwards when the element is flexing.

In one embodiment of the arrangement, the element is pivotally arranged around a shaft rotatably secured in the element and the first wheel. This arrangement provides a reliable securing of the element in the wheel.

In one embodiment of the arrangement, the adjustment means are arranged on the opposite side of axis A as the knife. This is favorable since the adjustment means are easy to access when arranged separated from the knife.

In one embodiment of the arrangement, the adjustment means comprises a securing element extending in radial direction from the element inwards to the first wheel such that the position of the element around axis A and the position of the knife in relation to the centre of the first wheel is adjusted by arranging the securing element in the intended position. This embodiment provides a reliable securing of the element and makes it possible to adjust the position of the knife with high accuracy.

In one embodiment of the arrangement, the securing element is embodied as a screw extending in radial direction from the element inwards to the first wheel such that the position of the element around axis A and the position of the knife in relation to the centre of the first wheel is adjusted by turning the screw. This embodiment make is possible to adjust the position of the knife with high accuracy.

In one embodiment of the arrangement, the securing element is elastic to increase the distance the knife is allowed to move when exposed to a load which could be very useful if an increased flex is desired. The elastic character of the securing element could be achieved by a screw with a limited diameter, a spring or a securing element made of an elastic material such as rubber.

In an alternative embodiment of the arrangement, the adjustment means comprises: a securing element arranged on the opposite side of axis A as the knife, said securing element is arranged to secure the element in a position such that the knife is arranged at a distance from the centre of the first wheel exceeding the desired distance from the centre of the first wheel; and an adjustment element arranged at the same side of axis A as the knife, said adjustment element comprising a head, an elongated rod and a treaded section in the opposite end as the head, said adjustment element is extending in substantially radial direction through the element and into corresponding treads in the first wheel, said head is in contact with the peripheral surface of the element such that the position of the knife in relation to the centre of the first wheel is adjusted by turning the adjustment element, and the rod extending through a corresponding passage in the element such that the element is able to flex inwards along the rod once a force is exerted on the knife.

This embodiment is very favorable since it makes it possible to adjust the force required to make the knife and element flex when exposed to forces from the sheet of paperboard and the second wheel during use. The adjustment of the arrangement is initiated by securing the securing element in a position such that the knife is extending further from the centre of the first wheel than desired final position of the knife and then force the element and knife to the desired position by the adjustment element, alternatively first arrange the adjustment element in the desired position and then the securing element.

In one embodiment of the arrangement, the securing element consists of a screw extending from the element towards the first wheel. The screw makes it easy to adjust the position of the securing position of the element In one embodiment of the arrangement, the securing element is elastic to increase the distance the knife is allowed to move when exposed to a load which could be very useful if an increased flex is desired. The elastic character of the securing element could be achieved by a screw with a limited diameter, a spring or a securing element made of an elastic material such as rubber.

In one embodiment of the arrangement the first wheel comprises two or three knifes. This embodiment is for several reasons very advantageous. First the additional knifes could be used as spare knifes to reduce the time for maintenance in case of failure of the first used knife. Secondly, the additional knifes could be used to perform further cuts on each lap of the first wheel, i.e. the first knife cut one end of the glue flap and the second knife the other. The additional knifes could furthermore be used to cut the removed piece of material into smaller pieces and reduce the risk that the removed pieces unintentionally causes problems in the manufacturing process.

The present invention furthermore relates to a machine for cutting and folding paper board sheets to form boxes. The machine comprises:

a feeding arrangement arranged to feed paper board sheets along a direction L;

at least one arrangement for cutting paper board sheets according to the definition above, and a folding arrangement arranged to fold said paper board sheets.

One embodiment of the machine comprises two arrangements for cutting paper board sheets arranged along the direction L. The fact that the machine comprises two arrangements for cutting paper board sheets is very favorable since the machine is able to handle larger box blanks since one arrangement could be used for cutting the leading edge of the glue flap and the other one for the trailing edge of the glue flap.

BRIEF DESCRIPTION OF THE DRAWINGS

The above as well as further objectives and features as well as advantages with the present invention will become apparent when studying the following illustrative and non-limiting detailed disclosure of preferred embodiments of the present invention, with reference to the appended drawings.

All figures are schematic, not necessarily to scale, and generally only illustrating selected parts which are necessary in order to elucidate the invention, wherein other parts may be omitted or merely suggested.

DETAILED DESCRIPTION

The present invention, as previously stated, relates to an arrangement for cutting paper board sheets. The arrangement is adapted to be arranged in a machine for cutting paper board sheets to form box blanks, and folding paper board boxes of said box blanks. In the figures, box blanks, selected parts of the arrangement according to the invention and the machine are illustrated in order to elucidate the essential features of the invention.

Manufacturing of boxes of corrugated paperboard is performed in two main steps. The first step involves the production of corrugated paperboard from rolls of paper, commonly three rolls, while the second step involves cutting, or trimming, of the paperboard to form box blanks which after folding and gluing form a box with the desired dimensions.

Figure 1:
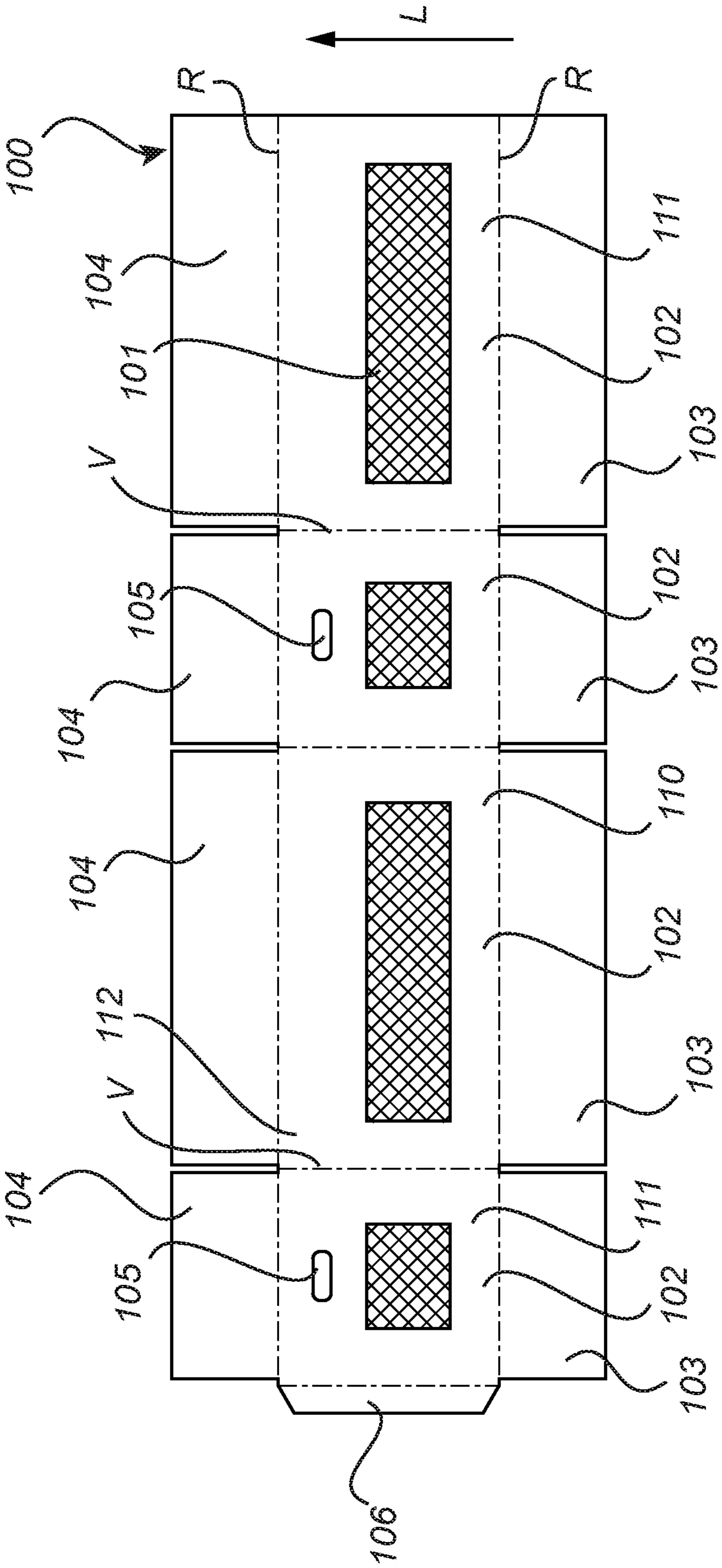
FIG. 1 illustrates an example of a paper board sheet cut to form a box blank.

To facilitate the folding of the top and bottom of the box creasing lines, also referred to as "scoring lines", are formed in the box blank. One conceivable variant of these creasing lines is illustrated in FIG. 1. The positions of the creasing lines are adapted to the desired size and shape of the box. Equipment to obtain these grooves/folding notches is not shown or described in this application since the equipment is well known in the art and not related to the invention this application aims to protect.

In FIG. 1 an example of a box blank 100 cut into a shape which after folding yields in a rectangular box of ordinary type. On the box blank 100, any contemplated decor 101 or text may be printed before folding since it is normally easier to print with the desired result before the box blank has passed the folding machine and obtained its final shape.

The box blank 100 illustrated forms a rectangular box and therefore comprises four side section 102 forming the side walls of the box, four bottom sections 103 forming the bottom of the box and four top sections 104 which may be utilized for closing the box. In the two opposite side sections handles105 have been cut out.

The box blank furthermore comprises a tongue 106, frequently also referred to as "glue flap", for adhesive or staples. After the folding, the glue flap will bear against the inner or outer side of the neighboring side section such that these are secured together by the adhesive or staples to form the box.

Figure 2:
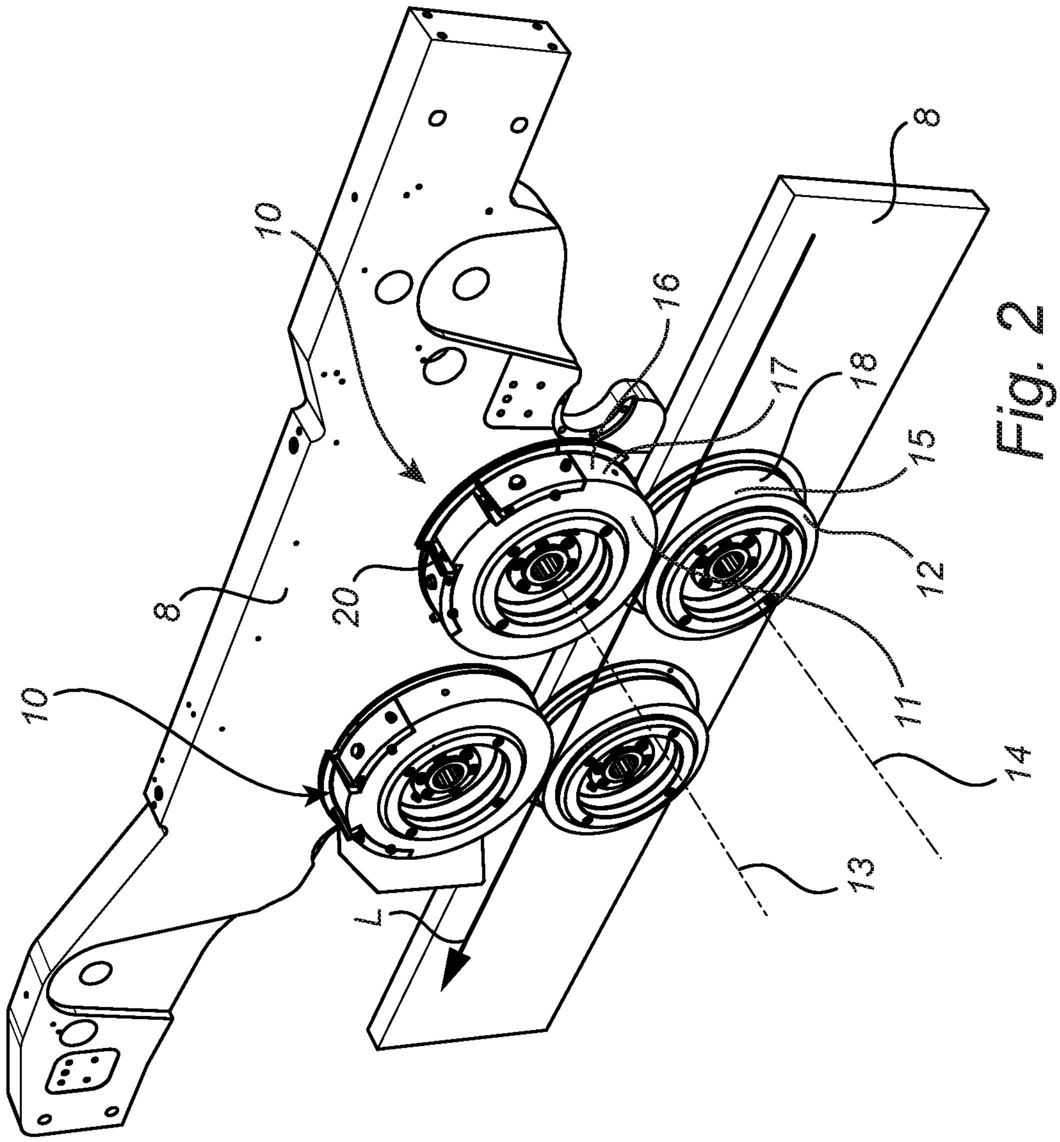
FIG. 2 illustrates the arrangement according to the invention schematically.

The arrangement 10 according to the invention is illustrated schematically in FIG. 2. The arrangement is intended for cutting selected parts of the paper board sheets to the desired shape and is particularly advantageous for cutting the glue flap.

The paper board sheets are fed through the arrangement 10 along a longitudinal direction L by a feeding arrangement not illustrated in FIG. 2 but described further down in the detailed description.

The arrangement 10 according to the invention comprises a first wheel 11 and a second wheel 12 that both are rotatably arranged around a corresponding first 13 and second axis 14. The first and second axes are substantially parallel and extend in substantially horizontal direction transverse to the feeding direction L of box blanks. The first and second wheel are arranged in the same plane transverse to the first and second axis with the outer periphery of the first and second wheel arranged adjacent to each other such that the paper board sheets are passing between the outer periphery of the first and second wheel. The first and the second wheel as well as thereto related different components are supported by a support frame 8 to ensure a rigid and stable support of the arrangement. In FIG. 2 only selected parts of the support frame are illustrated.

The outer peripheral surface 17, 18 of the first and second wheel is substantially flat to provide support for the paper board sheets fed between the wheels. The first wheel, arranged above the second wheel and illustrated in FIGS. 3 and 4, comprises at least one knife 20, in the illustrated embodiment two knifes 20, extending from the peripheral surface 17 in substantially radial direction from the axis of rotation such that the paper board sheets are cut by the knife 20 when passing between the first and the second wheel. However, the position of the first and second wheel in relation to the box blanks could be switched without changing the general idée of the invention.

The peripheral surfaces of the first and second wheel are in the illustrated embodiments substantially flat but could be slightly angled as long as the angle of the edge of the knife 20, or knifes, correspond to the angle of the peripheral surface of the second wheel. The second wheel peripheral surface is either made of a metal material or for example a less hard material such as a plastic material to reduce the wear on the knife.

In order to be able to cut both the leading and trailing edge of the glue flap two arrangements according to the invention are arranged along the feeding direction L such that the first arrangement is arranged to cut one of the glue flap edges while the second arrangement is arranged to cut the other glue flap edge. The fact that two arrangements according to the invention are used makes it possible to adjust the length of the glue flap depending on the actual design of the box.

The illustrated embodiment of the first wheel comprises two knifes 20 arranged in the same wheel. This arrangement is either used in order to make it possible to cut the leading and trailing edge of the glue flap, or intended to cut the removed piece of paper into smaller pieces to facilitate safe removal of the piece from the machine and reduce the risk that the removed pieces cause problems in the machine.

In the first wheel 17 a recess 21 is formed in the peripheral surface of the wheel corresponding to the position of each knife 20. The description is directed to one of these knifes 20 and the components related to this knife since the same configuration is used for both knifes 20.

The recess 21 extend along the peripheral surface 17 of the wheel and is large enough to house an element 22 formed as a circular arc. The dimensions of the element 22 are selected such that the convex side 23 of the circular arc has substantially the same radius as the peripheral surface 17 of the wheel. The element 20 has substantially the same width as the wheel along the axis of rotation and is pivotally secured in the wheel around an axis A substantially parallel to the first and second axis of rotation. The axis A is in the illustrated arrangement arranged close to the centre of the element 22 and the knife 20 extending from a first end 24 of the element outwards. Thereby the position of the knife edge 25 in relation to the centre of the wheel could be adjusted by pivoting the element 22 around the axis A and lock the element 22 in the position corresponding to the desired position of the knife 20. The knife 20 is removably arranged in the first end 24 of the element to facilitate replacement of the knife without replacing the element 20 at the same time. The knife extends in substantially radial direction from the centre of the first wheel from the element but is slightly angled in relation to the rotational axis in order to form a slightly tampered shape of the glue flap.

The position of the element 22 is controlled by adjustment means 30 arranged to secure the peripheral element in the desired position that ensures the correct position of the knife.

Figure 3A:
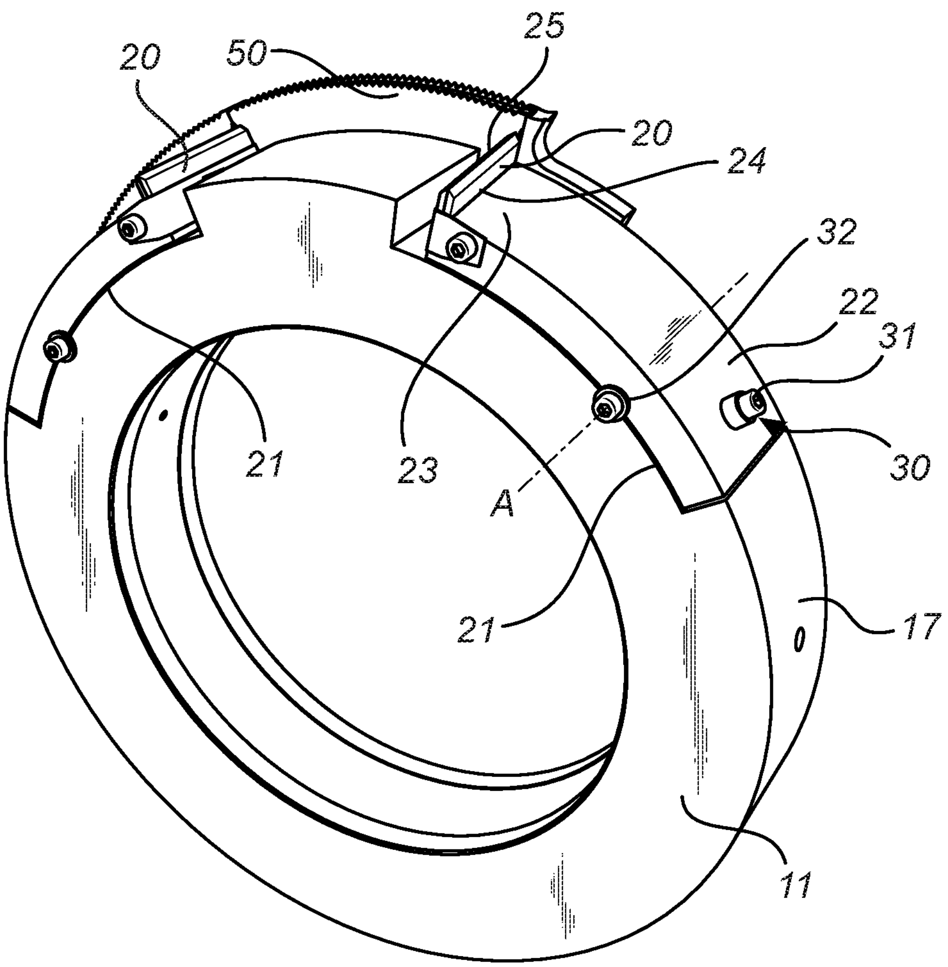
FIGS. 3*a* and 3*b* illustrates a perspective and a side view of selected parts of a first embodiment of the arrangement according to the invention schematically.
Figure 3B:
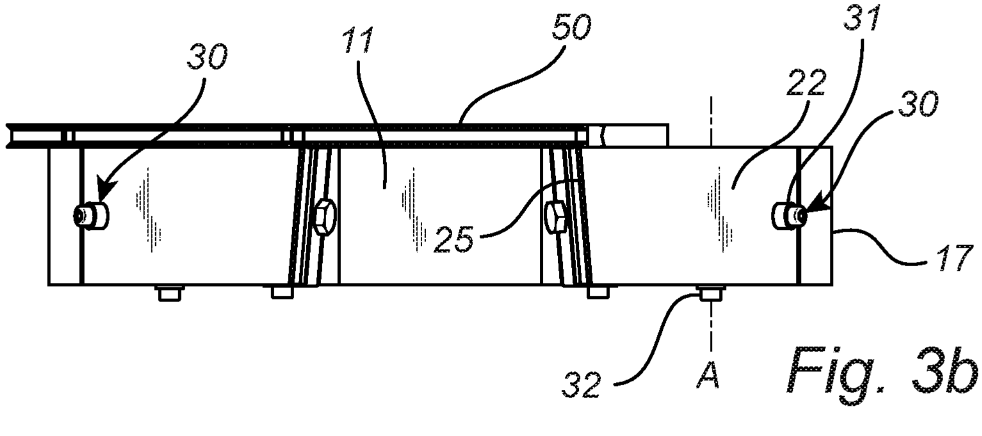

In FIG. 3 a first embodiment of the adjustment means 30 are illustrated. The adjustment means are arranged on the opposite side of the rotational axis A as the knife 20 and comprises a securing element embodied as a screw 31 extending in substantially radial direction from the element 22 inwards from the element 22 to the first wheel 11 such that the position of the element around axis A and the position of the knife 20 in relation to the centre of the first wheel 11 are adjusted by turning the screw 31. The screw 31 secures the element 22 in the selected position. The force exerted by the sheet of paper board and the opposite second wheel 12 on the knife 20 during cutting is directed in substantially radial direction towards the centre of the first wheel 11. The element 22 is then, due to its design, flexing slightly radially inwards such that the force exerted on the knife edge 25 is reduce and the risk for damages to the edge 25 reduced accordingly. The stiffness of the element depends on the material of the element, the distance between the rotational axis A and the knife and the dimensions of the element. All these parameters must be tested to achieve the desired characteristics of the arrangement.

If an increased movement of the knife is desired, the securing element 31 could be made elastic to allow the element to move around the axis A when a force is applied on the knife. This could be achieved by using a screw with a small radius or using a screw in which a elongated hole is drilled such that the elasticity of the screw is increased. Alternatively the screw could be replaced by a helical spring or rubber element extending between the element and the wheel to secure the element in the desired position. These embodiments are not illustrated in the figures.

Figure 4A:
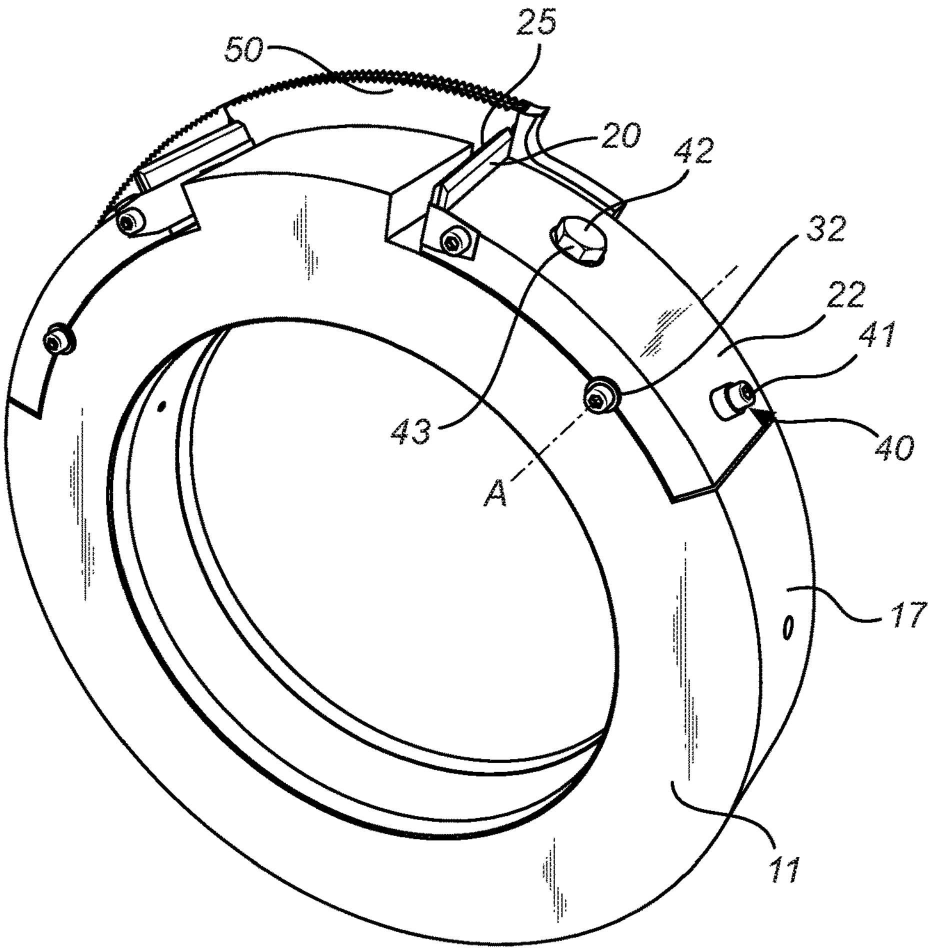
FIGS. 4*a* and 4*b* illustrates a perspective and a side view of selected parts of a second embodiment of the arrangement according to the invention schematically.
Figure 4B:
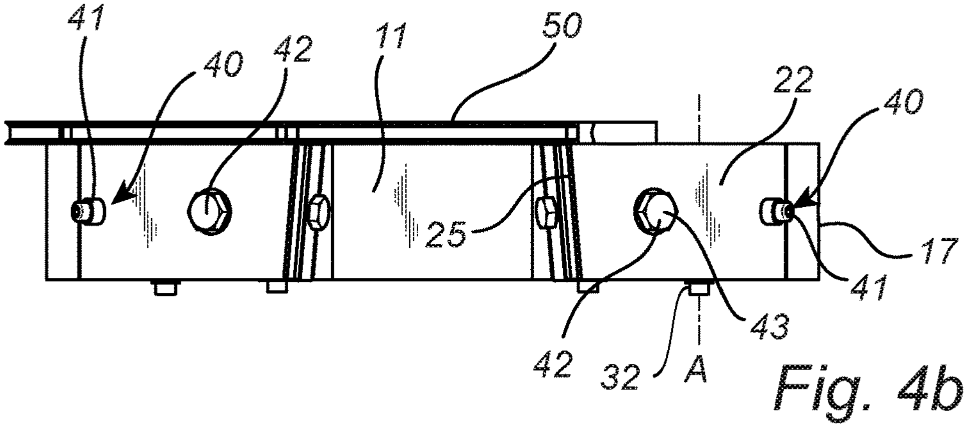

In an alternative embodiment of the adjustment means 40, illustrated in FIG. 4, the adjustment means 40 comprises a securing element 41 arranged on the opposite side of axis A as the knife. The securing element 41 is embodied as a screw extending in substantially radial direction from the element 22 inwards from the element 22 to the wheel 11 such that the element 22 is secured in the desired position around axis A by the screw. The adjustment means 40 furthermore comprises an adjustment element 42 arranged at the same side of axis A as the knife 20. The adjustment element, i.e. a bolt comprising a head 43, an elongated rod and a treaded section in the opposite end as the head, is extending in substantially radial direction through a corresponding passage in the element 22 and into corresponding treads in the wheel. The bolt head is in contact with the peripheral surface of the element but the element 22 is able to flex inwards along the rod once a force is exerted on the knife.

The calibration of the knife position with this second embodiment of the adjustment means 40 is done by first securing the tensioning element in a position such that the knife 20 is arranged at a distance from the centre of the wheel exceeding the desired distance from the centre of the first wheel. Once the first step is completed, the position of the knife in relation to the centre of the first wheel is adjusted by turning the adjustment element 42 such that the knife is forced towards the center of the wheel into the desired position of the knife. The calibration could also be done in the opposite order.

This embodiment of thee arrangement makes it possible to adjust the force required to make the knife and element flex when exposed to forces from the sheet of paperboard and the second wheel during use. The more pre-tension that is applied on the element, the higher the force applied on the knife and the element to make the element flex. The possibility to adjust the stiffness of the element is very advantageous since the arrangement could be adapted for different types of paper boards that require different forces to be cut in an efficient way. This arrangement furthermore increases the possibility for fine tuning of the arrangement. If an increased flexibility of the knife is desired, also this embodiment of the arrangement could be provided with an elastic securing element to allow the element to move around the axis A when a force is applied on the knife. A screw with a small radius or a screw in which a elongated hole is drilled alternatively a securing element embodied as a helical spring or rubber element provides the desired effect.

The first wheel 11 comprising the two knifes furthermore comprises a third knife 50 extending in the plane of the wheel between at least the first and second knife. The third knife 50 is substantially straight and intended for cutting the elongated side of the tongue. The third knife is arranged along the side surface of the wheel axially outside both the first 11 and the second wheel 12 and extend outside the peripheral surface 17 of the first wheel 11 in radial direction and past the peripheral surface 18 of the second wheel 12 such that the paper board sheet is cut between the third knife and the peripheral side edge of the adjacent wheel.

Figure 5:
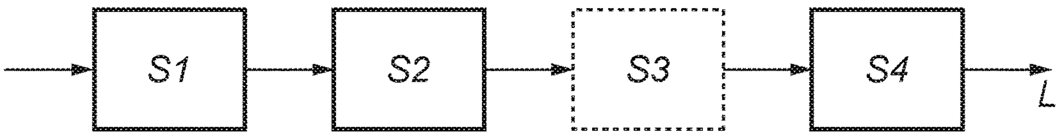
FIG. 5 illustrates the different steps performed in the machine comprising the arrangement according to the invention schematically.

The arrangement according to the invention is preferably used as one arrangement within a machine for manufacturing paper board boxes. The cutting of manufactured paper board into the desires shape is one step among several different steps that has to be completed to manufacture different types of boxes. One embodiment of a machine is schematically illustrated in FIG. 5 where examples of different steps performed in the machine are illustrated.

The first step (S1) in the machine involves the manufacturing of paper board from different rollers of paper. In the second step (S2) the paper board is cut to the desired size and shape to form box blanks. A third optional step (S3) could involve printing decoration on the box blanks before the folding of the box blanks is initiated in a fourth step (S4).

In order to perform the different steps the machine comprises several different arrangements and units arranged to perform the different manufacturing steps. Folding machines of this type have a considerable size and weight and the different arrangements and units described are all supported by a not fully illustrated support frame 8 which is placed on substantially planar and stable ground.

The machine comprises a longitudinal direction L1 which extends through the centre of the machine parallel to the feeding direction L of the box blanks through the machine. The schematically illustrated machine comprises, on either side of the longitudinal axis, substantially the same equipment arranged to perform analogous actions on the opposite sides of the box blank being moved through the machine.

Figure 6:
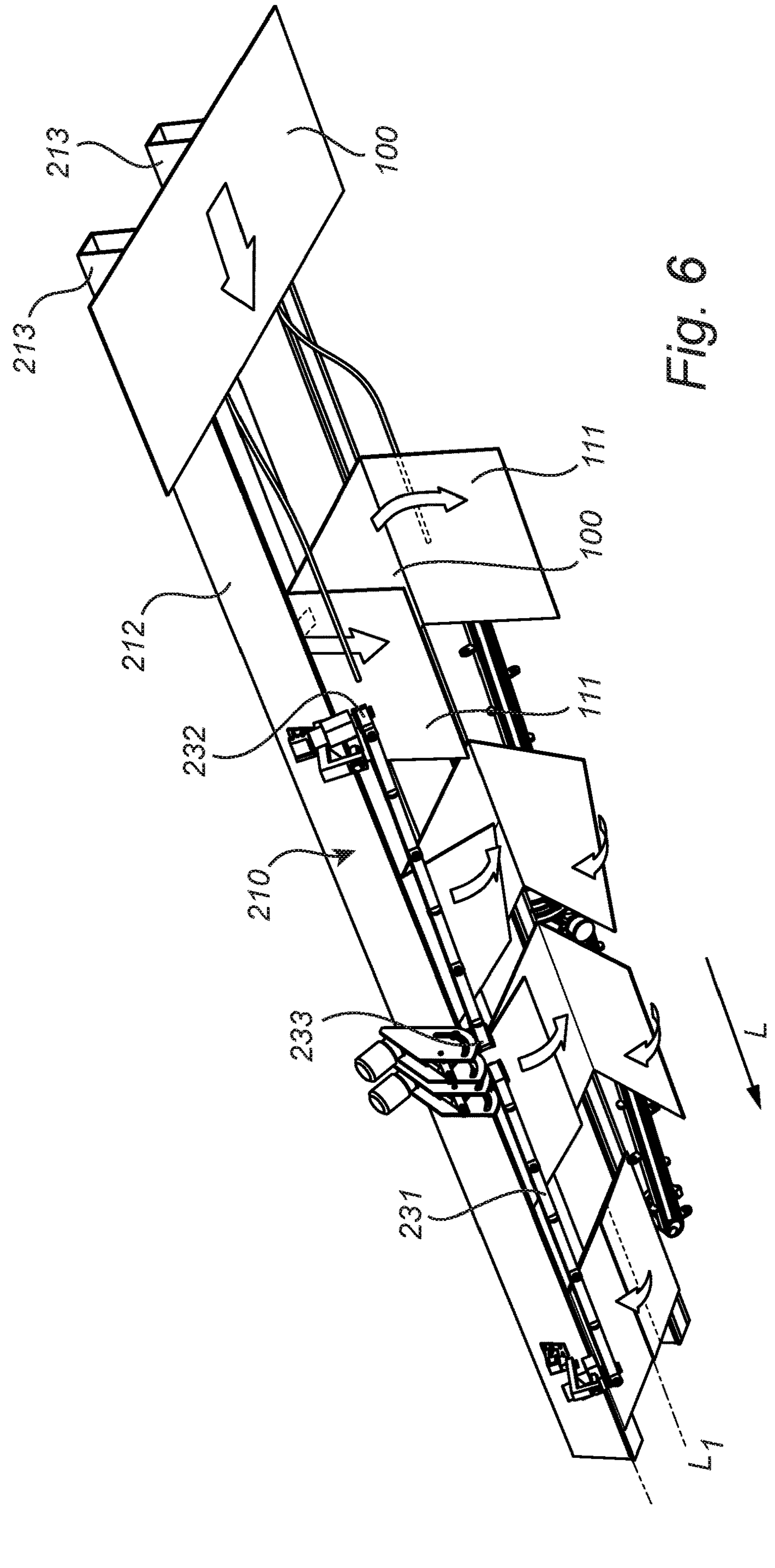
FIG. 6 illustrates selected parts of the machine.

In FIG. 6 selected parts of a folding unit 210 and feeding arrangement 212 are illustrated. The feeding arrangement comprises two longitudinal beams 213 extending parallel to the longitudinal axis L1 of the machine. The distance between the beams may be varied in order to be adapted the machine to box blanks of different sizes. The beams 213 are straight and extend along the total length of the feeding arrangement, i.e. the machine. Feeding belts run along the lower sides of the beams 213 and move at a desired feeding speed such that the box blanks are transported at a desired speed along the lower side of the beams through the different manufacturing steps performed in the machine.

The box blanks are placed with the side intended to form the outside of the finished box facing the feeding belt and the second portion is folded downwards, inwards with respect to the first portion.

The folding unit comprises a folding belt 231 which runs around at least a first wheel 232 arranged upstream along the feeding arrangement and a second wheel 233 arranged downstream along the feeding arrangement. The folding belt 231 is an endless belt which runs along the beam 213 at a continuous speed corresponding to the feeding speed of the box blanks.

The machine comprises a plurality of components each requiring control in order to function as intended. The machine therefore comprises a control unit controlling and steering the different arrangements and units in the machine. For example, the control units controls the feeding arrangement such that a desired feeding speed of box blanks 100 is obtained as well as adjusts the feeding arrangement to different box sizes and/or shapes. The control unit further comprises an interface for controlling/programming of the machine for setting the desired type of box, size etc.

In order to clearly illustrate the functionality of the arrangement according to the invention, the illustrations are simplified and need not be to scale, for example some measurements may be exaggerated in order to illustrate some features.

In the appended drawings different embodiments of the arrangement and machine according to the claims is illustrated. A plurality of the component of the arrangement and the machine may however be modified in a plurality of ways without departing from the scope of the invention as defined by the appended claims.

The invention claimed is:

1. Arrangement for cutting paper board sheets fed through the arrangement along a direction L, said arrangement comprising:

a first wheel arranged to rotate around a first axis extending substantially transverse to the direction L, said first wheel comprises at least one knife having a knife edge extending parallel to the first axis for cutting the paper board sheets and extending from a peripheral surface of the wheel, and said knife separating portions of a respective sheet of the paper board sheets by the cutting;

a second wheel arranged to rotate around a second axis extending substantially transverse to the direction L parallel to the first axis, said second wheel is arranged in the same plane as the first wheel and comprising a peripheral surface arranged adjacent the knife such that the paper board sheets are cut between the first and the second wheel;

wherein the first wheel comprises a respective element, located within a recess formed in a peripheral surface of the first wheel, for each respective knife with only a single knife being mounted upon each respective element, said element is formed as a circular arc with substantially the same radius as the peripheral surface of the first wheel and a corresponding recess formed in the first wheel peripheral surface, said element is pivotally arranged around an axis A substantially parallel to the first axis in said recess and said respective knife extending from the element such that the position of said respective knife in relation to the first wheel is adjusted by pivoting the element by adjustment means arranged to secure the element in the desired position, and said adjustment means comprising a screw extending, inwards in a radial direction with reference to the first axis of the first wheel, through the element and from the element to the first wheel at the recess, wherein the position of the element around axis A and the position of the knife in relation to the centre of the first wheel is adjusted by arranging the screw in the intended position via turning the screw relative to the element.

2. Arrangement according to claim 1, characterized in that the knife is removably arranged in one end of the element.

3. Arrangement according to claim 1, characterized in that the knife extend in substantially radial direction from the centre of the first wheel from the element.

4. Arrangement according to claim 1, characterized in that the element is pivotally arranged around a shaft rotatably secured in the element and the first wheel.

5. A arrangement according to claim 1, characterized in that the screw is elastic to increase the distance the knife is allowed to move when exposed to a load.

6. Arrangement according to any of claim 1, characterized in that the screw of the adjustment means is arranged on the opposite side of axis A as the knife, said screw is arranged to secure the element in a position such that the knife is arranged at a distance from the centre of the first wheel exceeding the desired distance from the centre of the first wheel; the adjustment means comprises an adjustment element arranged at the same side of axis A as the knife, said adjustment element comprising a head, an elongated rod and a treaded section in the opposite end as the head, said adjustment element is extending in substantially radial direction through the element and into corresponding treads in the first wheel, said head is in contact with the peripheral surface of the element such that the position of the knife in relation to the centre of the first wheel is adjusted by turning the adjustment element, and the rod extending through a corresponding passage in the element such that the element is able to flex inwards along the rod once a force is exerted on the knife.

7. Arrangement according to claim 6, characterized in that the securing element consist of a screw extending from the element towards the first wheel.

8. Arrangement according to claim 6, characterized in that the securing element is elastic to increase the distance the knife is allowed to move when exposed to a load.

9. Arrangement according to claim 1, characterized in that the first wheel comprises two or three knifes.

10. Machine for cutting and folding paper board sheets to form boxes, said machine comprising:

a feeding arrangement arranged to feed paper board sheets along a direction L;

at least one arrangement for cutting paper board sheets according to claim 1;

and a folding arrangement arranged to fold said paper board sheets.

11. Machine according to claim 10, wherein the machine comprises two arrangements for cutting paper board sheets according to claim 1 arranged along the direction L.

* * * * *